Figure 1:
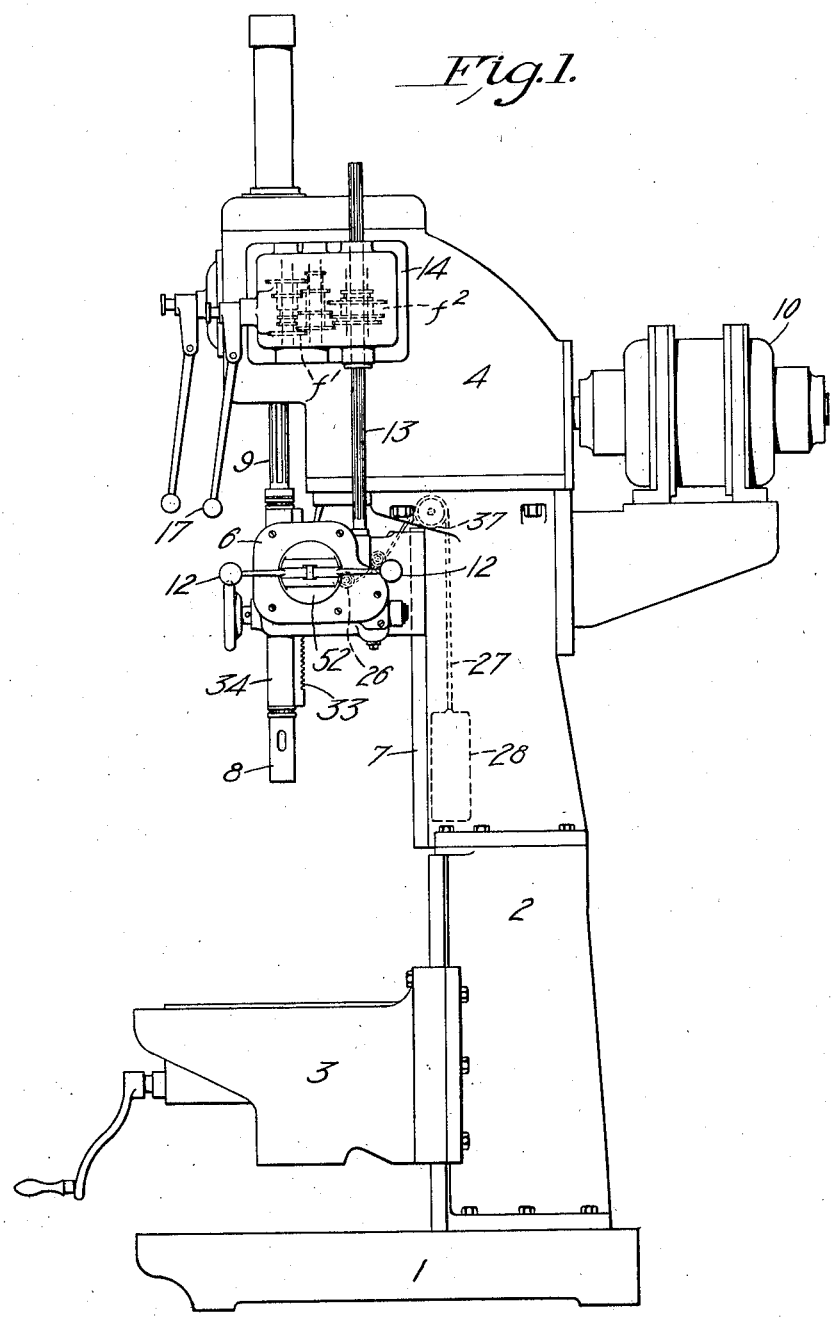

Nov. 26, 1935.　　　L. L. SCHAUER ET AL　　　2,022,437
HEAD AND SPINDLE COUNTERBALANCE
Filed Jan. 19, 1932　　　3 Sheets-Sheet 1

Inventors
Lawrence L. Schauer
Augustus M. Sosa
By Attorneys
Nathan, Bowman & Helferich Nov. 26, 1935. L. L. SCHAUER ET AL 2,022,437
HEAD AND SPINDLE COUNTERBALANCE
Filed Jan. 19, 1932 3 Sheets-Sheet 2
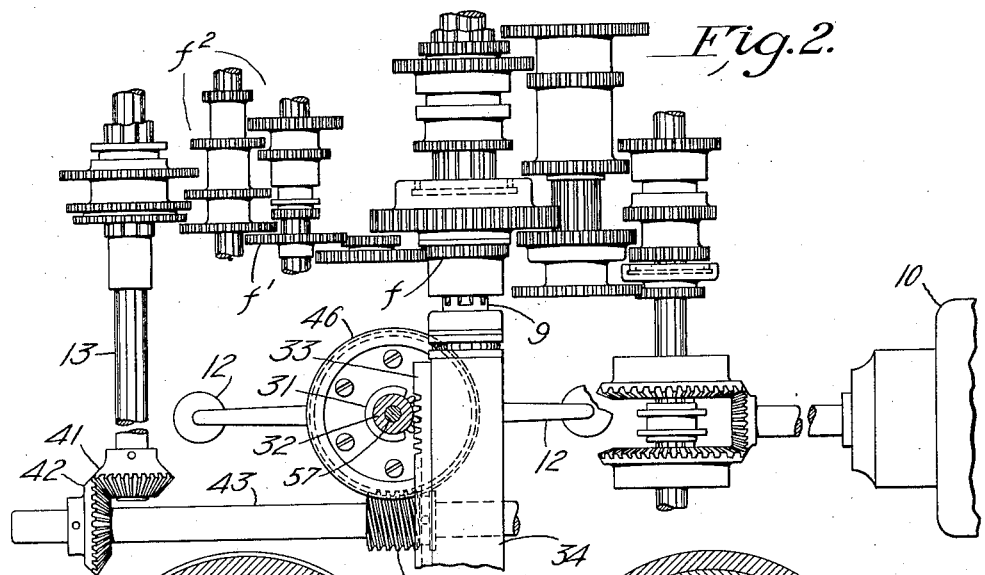
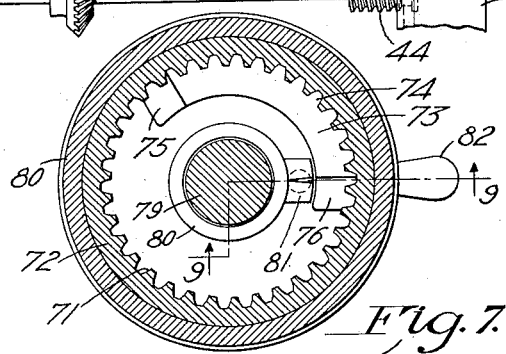
Fig. 7.
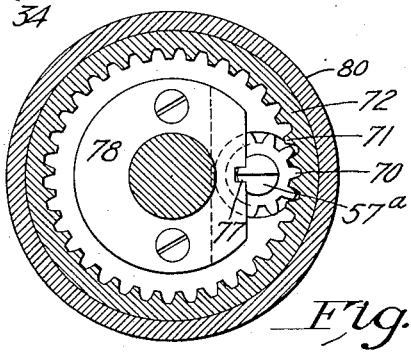
Fig. 8.
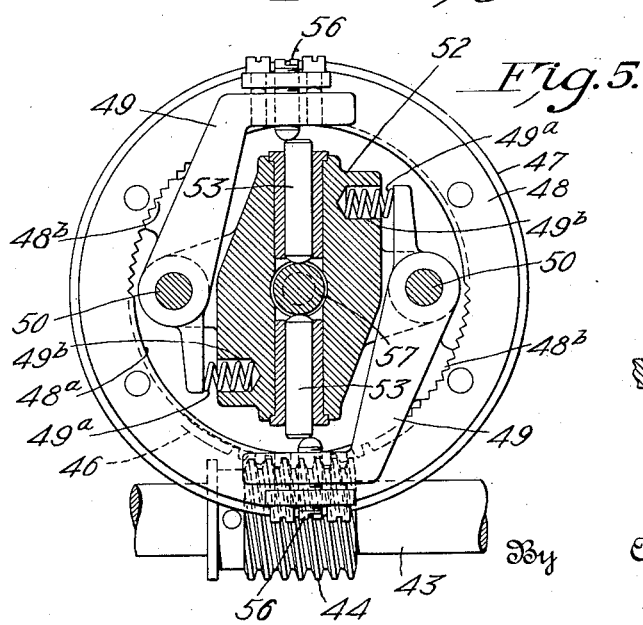
Fig. 5.
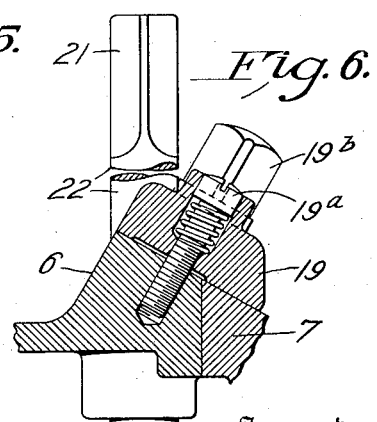
Fig. 6.
Inventors
Lawrence L. Schauer
Augustus M. Sosa
By Attorneys
Nathan Bowman + Helferich

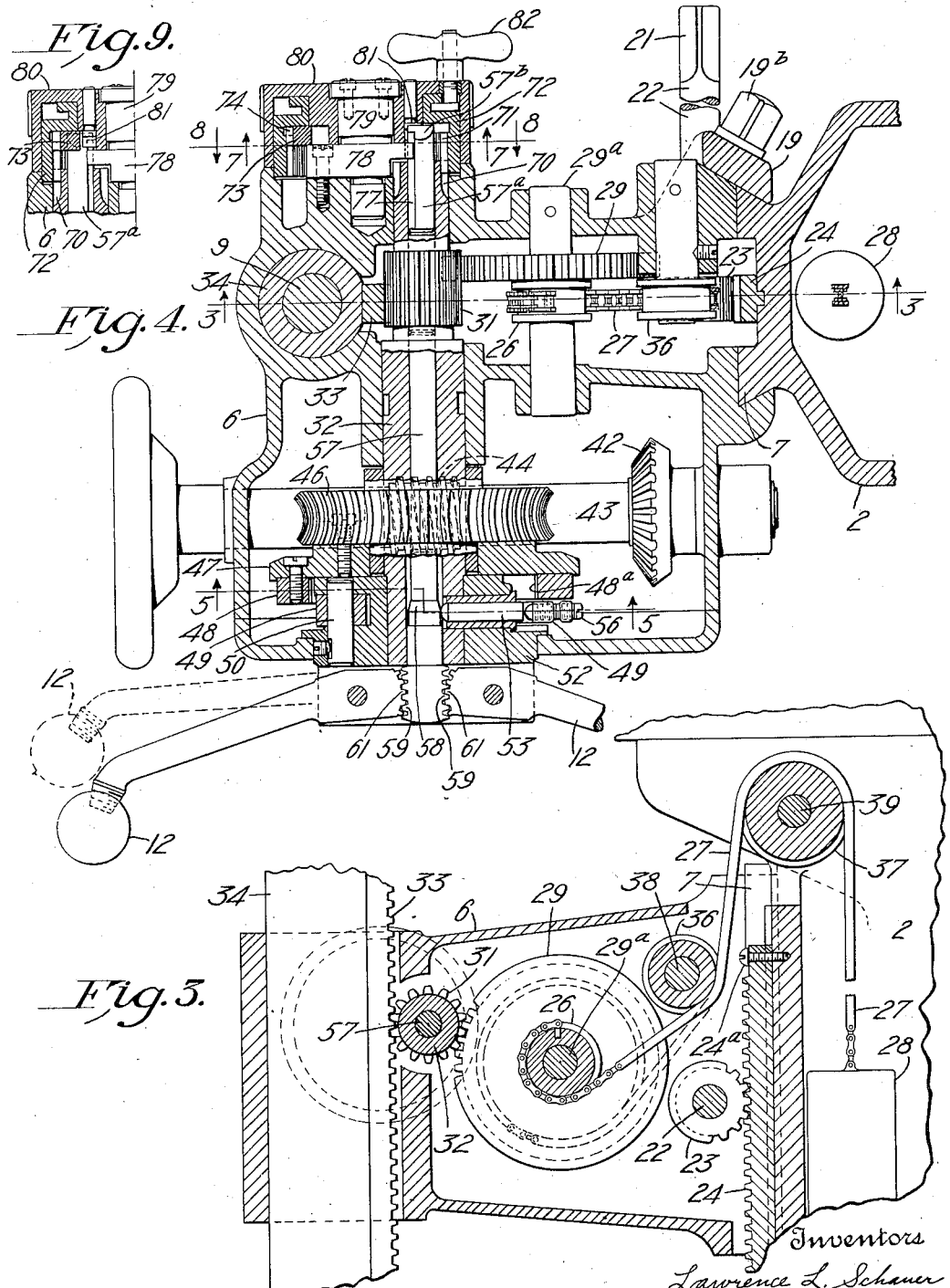

Patented Nov. 26, 1935

2,022,437

UNITED STATES PATENT OFFICE

2,022,437

HEAD AND SPINDLE COUNTERBALANCE

Lawrence L. Schauer and Augustus M. Sosa, Cincinnati, Ohio, assignors to The Cincinnati Bickford Tool Company, Cincinnati, Ohio, a corporation of Ohio Application January 19, 1932, Serial No. 587,532

2 Claims. (Cl. 77—36)

This invention relates to drilling machines and is more particularly concerned with improved means for suspending the tool spindle and/or the tool head in a manner as to be freely translatable, and with improved means for interrupting or discontinuing automatically the movements imparted by power to the freely translatable spindle at predetermined points in its travel.

It has for a primary object to provide in an adjustable head bracket of a drilling machine, a self-contained power and manual feed mechanism for effecting axial movements of the spindle, with means automatically effective to discontinue the power feed when the spindle reaches predetermined points in its range of movement relative to the head bracket. And by way of additional improvement to provide a compact and reliable depth gauge mechanism, movable as a unit with the spindle bracket, and adapted to be adjusted or set to throw out the power feed to the spindle when the spindle reaches a given point intermediate its normal limits of travel.

Still another object of this invention is to provide a single means for counterweighting the drill spindle in all of its positions and for counterweighting the spindle and the drill head or saddle when the latter is shifted along its support. And as a further refinement, to arrange the parts so that a counterweight, approximately equal to the weight of the spindle and tool head, may be effectively employed to balance the relatively light weight of the spindle when the relatively larger weight of the drill head is no longer carried by the counterbalancing mechanism or is clamped in a preselected position on the frame of the machine.

Another object of this invention is to provide means whereby the additional weight of multiple tool heads, fixtures, etc., that may be carried by the spindle and translatable therewith, may be readily and easily compensated for without changing or altering the size of the original counterweight.

Counterbalance mechanisms of various types have heretofore been designed to counteract the weight of tool heads and spindles, however, certain structural disadvantages thereof have detracted from the practicability of the prior constructions and rendered them objectionable in many ways. For example, one particular device for balancing both the head and spindle provides a complicated arrangement of pulleys and shafting in the frame or column as well as an additional pulley carried by the counterweight itself, besides a double extending cable attached to both the head and the spindle. Other devices require the weight to be tied or propped up to prevent it from falling when the spindle is removed from the tool head. Still other types provide means to adjust the counterpulling force solely by increasing or decreasing the weight itself, and also require a propping up of the spindle to prevent it from falling when the weight is removed preparatory to attaching a weight of a different gravitating force.

This invention furthermore seeks to overcome the disadvantages of prior constructions and provides a simple and efficient counterweighting mechanism devoid of complexities inherent in the prior constructions and one that may be easily installed to counteract the pull of the spindle and tool head, independently or collectively, and arranged in such a manner that the spindle may be easily removed from the machine without altering or disconnecting the counterbalancing mechanisms.

In carrying out the objects of this invention in a machine tool having an adjustable member and also a second member movable relative to the first member, it is proposed to provide a counterpulling force such as, for example, a chain and weight, substantially equal to the combined weight of both of the movable members. In accordance with this invention the weight is of a fixed value and the chain passes over a pulley journaled in a stationary part of the frame, then under a roller journaled in one of the movable members to a sheave wheel also journaled in the movable member. Thus far, it will be seen, the counterweighting mechanism is effective to balance the weight of only one of the movable members and so that the other member may also be counterweighted the sheave wheel is by suitable linkages which afford proper leverage connected indirectly with the second movable member. Thus if relative movement between the movable members is prevented the counterweighting mechanism functions to balance the weight of the two parts as a unit, but if one member is in a fixed position or remains stationary, proper counterweighting of the other member is effected through the lever connections above mentioned.

The absence of a direct couple between the counterweight and a tool spindle, for example, facilitates free and easy movement thereof and also of the spindle feeding mechanism by eliminating all impediments tending to bind the spindle which have heretofore been apparent in such prior constructions that have the counterweight chain fastened directly to the spindle and usually at one extreme end thereof.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a side elevation of an upright drilling machine embodying the present invention. Fig. 2 is a development of the gearing located largely in the upper section of the column, showing the spindle drive and feed gearing. Fig. 3 is an enlarged sectional view of the adjustable head, taken along the line 3—3 of Fig. 4, and showing the connections between the counterbalance mechanism and the tool spindle. Fig. 4 is a horizontal sectional view of the head showing particularly the connection between the spindle translating mechanism and the counterbalance mechanism. Fig. 5 is a detail sectional view of the power feed clutch and Fig. 6, a sectional view of the head clamping mechanism. Figs. 7, 8 and 9 are detail sectional views taken substantially along lines 7—7, 8—8 and 9—9 respectively of the drawings and illustrating more clearly certain details of the automatic throwout for the spindle power translating mechanism.

Referring more specifically to the drawings, the invention is disclosed as embodied in an upright drilling machine, combining, as shown in Fig. 1, a base 1, a frame or column 2, which supports a vertically adjustable work-table 3, a head bracket 4, and a slidable tool head or saddle 6. The tool head 6 is adjustable vertically on guideways 7 formed on the face of the column 2 and provides a relatively long bearing for a translatable tool spindle 8 translatable therein. The spindle 8 receives power through a shaft 9 which has a splined connection with suitable change speed gearing located within the bracket 4 and driven by a suitable prime mover such as an electric motor 10 mounted on a bracket on the column.

The tool spindle is also translatable relative to the tool head 6 by means of feed mechanism carried in part by the bracket 4 and in part by the spindle head 6. A convenient, double armed, quick return lever 12 carried by the tool head 6 controls the manual and power feed to the spindle, as will now be explained.

Suitable feed change gears $f^2$ journaled in a removable gear box 14, receive power from the spindle through the gears $f$ and $f'$ shown in dotted lines in Fig. 1 and full lines in Fig. 2, and transmit motion at various rates to a feed shaft 13. A control lever 17, situated convenient to the operator is adapted to control the positioning of the change gears $f^2$ whereby the power feed of the spindle may be effected at various rates, each one of which, it will be noted, will bear a direct relation to the speed of the spindle.

The feed shaft 13 has a splined connection with the gears in the feed box and transmits motion to a worm shaft 43, journaled in the bracket 6, through the medium of a pair of bevel gears 41 and 42. The worm shaft 43 carries a worm gear 44 that meshes with a worm wheel 46 normally freely rotatable on a pinion shaft 32 but which may be clutched thereto when desired to move the spindle axially by power. The worm wheel has secured thereto a flange member 47 provided with an annular ring 48 having serrations or teeth 48ᵃ formed on its internal surface. Complemental clutch teeth 48ᵇ are formed on members 49 which are adapted to be engaged with the internal teeth 48ᵃ. The members 49 are preferably in the form of levers and are pivoted at 50 in a hub member 52 rotatable with the pinion shaft 32. Intermediate the ends of each lever the serrations previously mentioned are formed, and the free ends thereof are provided with adjustable screws 56 for the purpose of effecting the engagement with push pins 53 and for making adjustments in the action of the clutch. Thus, it will be seen, if the pins 53 are moved outwardly, the levers 49 are rocked about their fulcrums 50 and the serrations 48ᵇ brought into engagement with the serrations 48ᵃ formed on the power driven member 48. In this way positive acting clutch means are provided for clutching the driven worm wheel to the pinion shaft 32.

The shifting of the push pins outwardly is effected by an axially movable cam rod 57, slidably mounted in a bore formed centrally in the pinion shaft 32, and which is provided with a cam surface 58 and rack teeth 59. The teeth 59 are adapted to be engaged by teeth 61 formed at the ends of control levers 12. When either of the levers are moved away from the machine (full line position Fig. 4) the rod 57 is moved inwardly thereby projecting the push pins outwardly by the slope of the cam faces 58 and the power feed is thrown in. Shifting of the control lever 12 inwardly (dotted line position) retracts the rod 57 and the pins 53 ride down the cam face 58 under the impelling force of springs 49ᵃ. Referring to Fig. 5 it will be noted that the springs 49ᵃ are seated in recesses 49ᵇ in the hub member 52 and exert a force upon the levers 49 in a direction normally tending to release the engagement of the clutch teeth 48ᵃ and 48ᵇ and thus disconnect the power drive.

The shaft 32 carries a gear or pinion 31, preferably integral therewith, which meshes with the rack teeth 33 cut upon or secured to the spindle sleeve 34. Thus rotation of the shaft 32 by the levers 12 or by the power means, above explained, imparts translatory movements to the tool spindle. It will be understood, of course, that the spindle sleeve is translatable but non-rotatable in bearings provided in the head bracket 6.

Referring more particularly to Figs. 3, 4 and 6 one form of a unique counterbalance mechanism is illustrated which is adapted to counteract the combined weight of the spindle 8 and of the slidable saddle 6, or of the tool spindle independently of the saddle, when the saddle is rigidly secured to the column as by means of the clamping mechanism shown particularly in these figures. In Fig. 4 it will be noted that the guideways 7 formed on the column are of the dovetail or V-type to insure accurate alignment of the head and spindle in all positions thereof. Clamping of the head to the column is effected by means of a cleat member 19 which is normally maintained in closed sliding engagement with the ways 7 by the screws 19ᵃ but which is also adapted to be brought more firmly into engagement with the guideways by means of clamp screws 19<sup>b</sup> rigidly to clamp the head 6 in a preselected position on the column. When the clamp screws are released the head 6 is free to be moved vertically and which movement may be effected by a rack and pinion connection 23 and 24, the pinion 23 being carried by the drill head and the rack 24 being secured to the column.

To facilitate the vertical adjustment of the tool head, a shaft 22, upon which the pinion 23 is secured, projects from the head 6 and is provided with a squared end 21 for the reception of a suitable wrench or crank handle. Limit screws 24<sup>a</sup> (only one of which is shown) are provided at each end of the rack 24 for the purpose of positively engaging the teeth of the pinion at that point thus stopping further movement thereof when the head reaches either extreme limit of its movement.
While effecting such adjustments of the head the latter is adequately counterbalanced by the means now to be explained with reference more particularly to Fig. 3.

In this figure it will be noted that a gear 29 journaled upon a shaft 29<sup>a</sup>, that is removably secured in the saddle, meshes with the spindle translating pinion 31. Upon the hub of the gear 29 a sheave wheel 26 is formed and to which one end of a counterweight chain or cable 27 is connected. The chain then passes under an idler 36, also journaled in the saddle 6, and thence over a pulley 37 journaled in the column to a weight 28. Now, as the pinion 31 is turned counterclockwise, by either power or manual means, so as to lower the spindle 9, the gear 29 is turned clockwise and thus elevating the weight 28 by the winding of the chain 27 about the periphery of the sheave 26.

An important feature of this invention is the provision of means whereby a counterweight of a value many times in excess of the value of the load to be balanced may be used to maintain the part in equilibrium. In this respect the diameter of the sheave 26 and the ratio of the gears 29 and 31, it is to be noted, are important factors in determining whether a weight, substantially equal to the combined weight of the saddle and spindle, may be employed satisfactorily as the counterbalancing means for the spindle alone.

In a given machine the weight of the spindle and tool carried thereby may, for example, be one-third that of the counterweight; in another machine the weight of the spindle and tool carried thereby may be twice that, and so that the one counterweight may be employed to effect a balancing of the spindle irrespective of the weight of the tool secured thereto, it is proposed to arrange the sheave wheel and gear 26 and 29 respectively, so as to be removable in an easy manner, and to provide interchangeable or replaceable sheaves of varying diameters. In this way can the weight 28 of a fixed value, be used to counterbalance various spindle weights. The full line position of the sheave in Fig. 3 illustrates the connection for balancing the normal weight of a spindle, while the dotted line position of the sheave in that figure, illustrates a larger size sheave used when balancing a heavier spindle.

The change-over from one size sheave to another is, of course, made when the machine is idle and to prevent the spindle from dropping during the change, the clutch lever 12 is actuated so as to connect the pinion shaft 32 with the worm wheel 46 and its irreversible drive worm 44 thereby locking the spindle in place.

When it is desired to change the position of the head 6 with respect to the column, the spindle is again locked, as above explained, and the clamp screws 19<sup>b</sup> (only one of which is shown) is partially released. A suitable crank or handle is then placed upon the squared end 21 of shaft 22 and the latter rotated thereby to elevate or lower the head and spindle.

Referring to Fig. 3 it will be noted that a further result of locking the spindle is also to lock the gear and sheaves 29 and 26 against rotation, which in effect, secures the end of the counterweight chain directly to the head. It will be observed also that by positioning the idler 36 as close to the plane of the guides or ways 7, the pull of the counterweighting mechanism is substantially in the same plane, and thus there is no binding action or tendency to cant during movement of the head. And inasmuch as the counterweight substantially balances the weight of the head and spindle, very little effort is required to raise or lower same. It may be mentioned here that during the raising or lowering operation the head is maintained in alignment by means of the spring pressed clamping cleat 19. Fig. 6 illustrates one form of means for maintaining the head true even though the clamp screws 19<sup>b</sup> are released.

When the head has been adjusted to the desired position the clamp screws are again tightened and the necessary adjustment to the depth gauge made to suit the characteristics of the tooling operation.

Referring more particularly to Fig. 4, it is to be noted that the improved depth gauge and safety power throw-out mechanism is carried wholly by the adjustable tool head 6 and is so arranged as to suspend the power drive to the spindle at either extreme movement thereof with respect to the head and irrespective of the position of the head upon the column.

To accomplish that end, the pinion shaft 32 is provided with a gear 70 which is constantly in mesh with the teeth of an internal gear 71 formed in a rotatable sleeve member 72. The sleeve member 72 carries an adjustable cam member 73 which is arcuately shaped and provided with teeth 74 that engage the teeth of the sleeve. Each end of the cam member is provided with a cam face 75 and 76 adapted to engage the end of the push rod 57<sup>a</sup> and declutch the power drive at the high and low limits of travel of the spindle.

The cams 75 and 76 may, of course, be formed as separate members and individually adjustable. Fig. 7, however, depicts both cams on a single arcuate member, which holds itself in place by its own formation, without additional locking devices. Adjustments thereof are readily obtained by sliding the member axially and re-inserting same in another position.

The push rod 57<sup>a</sup> is in effect a continuation of the rod 57, but is non-rotatable, and is provided with inclined faces 57<sup>b</sup> at the end thereof that lies in the path of movement of the normally fixed cams 75 and 76. To keep the pin 57<sup>a</sup> from rotating while yet permitting same to be moved axially, one side thereof is provided with a key 77 that slides in a groove or slot formed in one edge of a collar 78. In this way the proper relationship between the bevelled end of the push pin and the actuating cams 75 and 76 is maintained.

The collar 78 is secured in a suitable manner to the head frame and is provided at its outer side with a stub 79 upon which is journaled a graduated cup or dial member 80. The dial 80 is adjustable but normally rotates with the sleeve member 72 and carries an additional cam element 81, which also is adapted to engage the pin 57a to actuate same at a predetermined point in the travel of the spindle. Figs. 7 and 9 illustrate the relative positions of the fixed dogs 75 and 76 and the adjustable dog 81, each of which it will be noted, is spaced radially unequal distances so as not to interfere with each other.

The adjustable dog 81 is adapted to be shifted to occupy normally any position intermediate the fixed dogs 75 and 76 thereby to engage the pin 57a and throw-out the power feed at any given point in the travel of the spindle. As an aid in the positioning of the trip dog 81, the outer periphery of the dial 80 is graduated in a suitable manner and a zero point or line is scribed on an adjacent portion of the frame to cooperate therewith.

To set the trip dog, the clamp screw 82 is released, thereby permitting the dial to turn relative to the sleeve 72, and the dial is turned ahead or back, until the proper graduation coincides with the zero point on the frame, and then reclamped securely to the driven sleeve 72. The ratio of the gears 70 and 71 is such that the dial and sleeve make something less than a complete revolution for the full movement of the spindle and thus there can be no possible confusion in the setting of the dial. However, should the spindle be in an intermediate position and the operator inadvertently sets the dial to give a further feed or traverse more than the travel yet remaining in the spindle, one of the fixed dogs 75 or 76, the positions of which bear a definite relation to the spindle movements, will be carried around and actuate the push pin 57a and thus disconnect the power drive before any damage is done to the mechanism by reason of the spindle reaching its extreme limit of travel.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States:—

1. A drilling machine comprising an upright standard having head guideways formed upon the front thereof; a tool head translatably mounted on said guideways and a rack and pinion mechanism for translating said head on said standard; clamping means for said head; counterbalancing means for said head comprising a counterweight and a cable between said counterweight and said head, said cable passing over a pulley journaled in said standard above the said guideways and then under a pulley journaled in said head, an effective portion of the periphery of each of said pulleys being substantially in the plane of said guideways so that the counteracting pull of the counterweight acts upon the head substantially in the plane of said guideways; a tool spindle translatably journaled in said head; a second rack and pinion mechanism for translating said spindle relative to said head; and a sheave wheel carried by said head having a peripheral portion of one diameter engaged by and tracked by the end of said cable and another peripheral portion of a larger diameter provided with gear teeth adapted directly to engage said spindle translating pinion, said counterbalancing means thereby acting to counterbalance the weight of said spindle and head together or of said spindle separately and adapted to exert upon said members in any position thereof a counteracting force of a constant value.

2. A drilling machine combining an upright standard having guideways formed thereon; a substantially closed tool head mounted on said guideways and projecting laterally from said standard, a rack on said standard and a pinion journaled in said head for effecting translatory movements of said head along said guideways; counterbalance means for said head comprising a counterweight located in the standard and a chain connecting the counterweight with the head, said chain passing over a wheel journaled at one side of the plane of said guideways in the upper portion of said standard, thence through an aperture formed in said closed head and under a wheel journaled in said head at the other side of the plane of said guideways, said wheels being positioned so that effective peripheral portions thereof and the counteracting pull of said counterweight are substantially in the plane of said guideways; a tool spindle and a cooperating spindle sleeve having a rack formed thereon journaled in said head; a feed pinion meshing with said rack and adapted to impart feed movements to said spindle; and counterbalancing means for said spindle and sleeve comprising said weight and chain and a sheave wheel for reducing to a known value the effective counteracting force of said counterweight upon said spindle, said sheave wheel being journaled in said closed head and having a peripheral toothed portion directly engaging said feed pinion and another portion constituting the sheave proper to which the end of said chain is connected, said chain and counterweight thereby serving as counterbalancing means for said tool head and said spindle or for said spindle alone and capable of imposing on said members in all positions thereof, a counteracting force of a constant value.

LAWRENCE L. SCHAUER.
AUGUSTUS M. SOSA.